United States Patent
Sanghera et al.

(10) Patent No.: US 8,652,281 B2
(45) Date of Patent: Feb. 18, 2014

(54) SPINEL CERAMICS VIA EDGE BONDING

(75) Inventors: Jasbinder S. Sanghera, Ashburn, VA (US); Shyam S. Bayya, Ashburn, VA (US); Guillermo R. Villalobos, Springfield, VA (US); Ishwar D. Aggarwal, Fairfax Station, VA (US); Robert E Miklos, La Plata, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 87 days.

(21) Appl. No.: 13/354,143

(22) Filed: Jan. 19, 2012

(65) Prior Publication Data

US 2012/0196105 A1    Aug. 2, 2012

Related U.S. Application Data

(60) Provisional application No. 61/437,880, filed on Jan. 31, 2011.

(51) Int. Cl.
*C03B 29/00* (2006.01)
*B32B 37/00* (2006.01)
*B29C 65/00* (2006.01)
*C04B 37/00* (2006.01)
*C08J 5/00* (2006.01)

(52) U.S. Cl.
USPC ............... 156/89.11; 156/153; 156/272.2; 156/325; 156/281; 156/154; 156/87; 156/257; 156/309.6

(58) Field of Classification Search
USPC ........... 156/89.11, 153, 272.2, 325, 281, 154, 156/87, 257, 309.6; 264/1.21, 1.7, 325; 228/231, 121, 165; 437/225; 117/1
See application file for complete search history.

(56) References Cited

U.S. PATENT DOCUMENTS

| | | | | |
|---|---|---|---|---|
| 4,721,541 A | * | 1/1988 | Hodges | 156/89.14 |
| 5,201,977 A | * | 4/1993 | Aoshima | 156/153 |
| 7,803,451 B2 | * | 9/2010 | Lee et al. | 428/195.1 |
| 2010/0126219 A1 | * | 5/2010 | Bayya et al. | 65/32.1 |
| 2011/0315808 A1 | * | 12/2011 | Zelinski et al. | 244/3.16 |

* cited by examiner

*Primary Examiner* — Philip Tucker
*Assistant Examiner* — Alex Efta
(74) *Attorney, Agent, or Firm* — US Naval Research Laboratory; Stephen T. Hunnius

(57) ABSTRACT

Disclosed herein is a method for making transparent ceramic spinel windows, domes and other complex shapes via edge bonding.

9 Claims, 4 Drawing Sheets

(a) (b)

SPINEL CERAMICS VIA EDGE BONDING

This application claims priority to and benefit of U.S. Patent Application No. 61/437,880 filed Jan. 31, 2011 the entirety of which is herein incorporated by reference.

BACKGROUND

This application concerns a method of making transparent ceramic spinel windows, domes and other complex shapes.

BRIEF SUMMARY OF THE INVENTION

Spinel ($MgAl_2O_4$) is a rugged, hard and strong ceramic material which transmits from the UV to the infrared (0.2 to about 6 μm). The ceramic is made by densifying powder at elevated temperatures.

Spinel can be achieved by hot pressing powders or by sintering a pre-shaped green body. This leads to closed porosity and/or a density greater than 90%. Subsequent hot isostatic pressing (HIP) eliminates residual porosity to leave a fully dense ceramic.

The sintering process relies on monodisperse nano-powder and proper cold shaping prior to sintering at elevated temperatures. This process has proved very difficult to make transparent spinel ceramic and leads to warping of larger parts or complex shapes due to non-uniform densification.

The hot pressing has been demonstrated by us to be reproducible since the die design dictates the shape of the final ceramic part.

This has been very successful to make flat spinel parts but leads to problems when trying to make complex shapes such as domes, especially hyperhemispherical, and ogives, etc. The unique aspect ratio of domes and especially ogive domes makes it very difficult to hot press without inducing excessive stresses which cause premature mechanical failure during hot pressing.

DETAILED DESCRIPTION

This disclosure teaches a method of making transparent ceramic spinel windows, domes and other complex shapes.

This disclosure teaches a method that overcomes the current issues and fabricates crack-free high optical quality spinel ceramic parts such as domes and flats larger than can be achieved by hot pressing alone.

This disclosure is based on edge bonding two or more parts together to make a transparent article. The bondline is invisible after the bonding process and the final part has the same properties as the original spinel including optical and mechanical properties.

Spinel ($MgAl_2O_4$) is a rugged, hard and strong ceramic material which transmits from the UV to the infrared (0.2 to about 6 μm). The ceramic is made by densifying powder at elevated temperatures. This can be achieved by hot pressing powders or by sintering a pre-shaped green body. This leads to closed porosity and/or a density greater than 90%. Subsequent hot isostatic pressing (HIP) eliminates residual porosity to leave a fully dense ceramic.

The sintering process relies on monodisperse nano-powder and proper cold shaping prior to sintering at elevated temperatures. This process has proved very difficult to make transparent spinel ceramic and leads to warping of larger parts or complex shapes due to non-uniform densification.

The hot pressing has been demonstrated by us to be reproducible since the die design dictates the shape of the final ceramic part. This has been very successful to make flat spinel parts but leads to problems when trying to make complex shapes such as domes, especially hyperhemispherical, and ogives, etc. The unique aspect ratio of domes and especially ogive domes makes it very difficult to hot press without inducing excessive stresses which cause premature mechanical failure during hot pressing.

Figure 1:
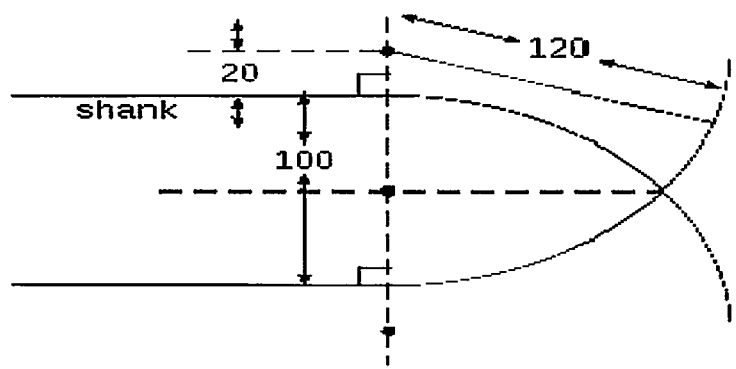
FIG. 1 illustrates a geometric shape of an ogive.

An ogive dome's size and shape, including sharpness are defined in FIG. 1. The sharpness of an ogive dome is expressed by the ratio of its radius to the diameter of the cylinder; a value of one half being a hemispherical dome, and larger values being progressively more pointed. The more pointed the dome, the more difficult it is to make.

Two or more spinel parts can be polished to a surface roughness of better than 1 nm. This is critical since larger surface roughness leads to trapped voids after the bonding process.

The two or more parts are then brought together and heated to about ⅔ (1000-1200 C) of the hot pressing temperature (1500 C) for several hours to effectively bond the parts together.

The joined part can be further polished to the desired finish.

This method is very effective at tiling spinel ceramics together and diffusion bonding to make larger panels. Similarly, a custom, yet simpler die is needed to make a half dome and with much reduced stresses.

After polishing and edge bonding the parts together, only one monolithic part remains with an invisible or almost invisible bondline. This is a successful method to make spinel ogive domes.

EXAMPLES

Example 1

Figure 2:
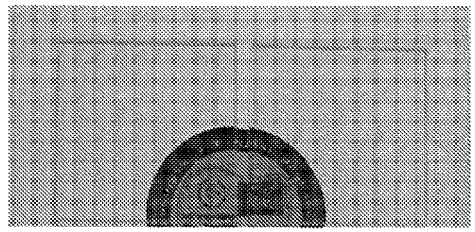
FIG. 2(a) illustrates two spinel ceramic tiles prior to diffusion bonding and (b) illustrates after diffusion bonding.
Figure 2:
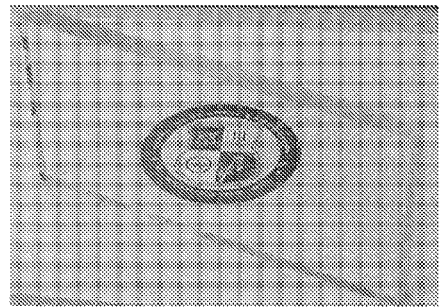

Two spinel 3"×3"×½" thick transparent tiles were edge polished to <1 nm surface roughness (FIG. 2(a)). The samples were brought together and held under slight load, heated up to 1100 C at 5 C/min and held for 6 hours, and then cooled slowly to room temperature at 1 C/min. The final part was polished to remove surface debris and artifacts.

FIG. 2(b) shows the final part which exhibits excellent optical transparency from the UV to 5 μm, similar to or same as the parts prior to bonding.

Example 2

Figure 3:
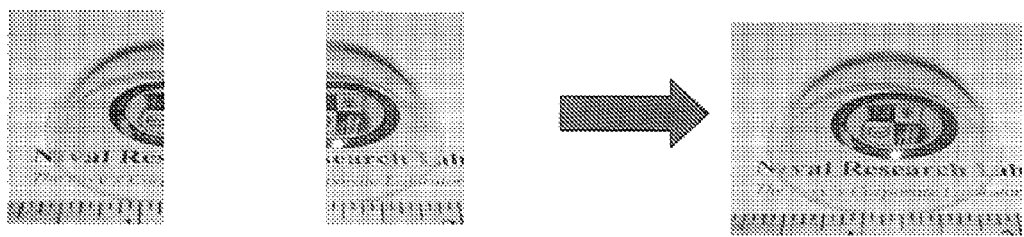
FIG. 3 illustrates an edge bonded approximately hemispherical spinel ceramic dome.
Figure 4:
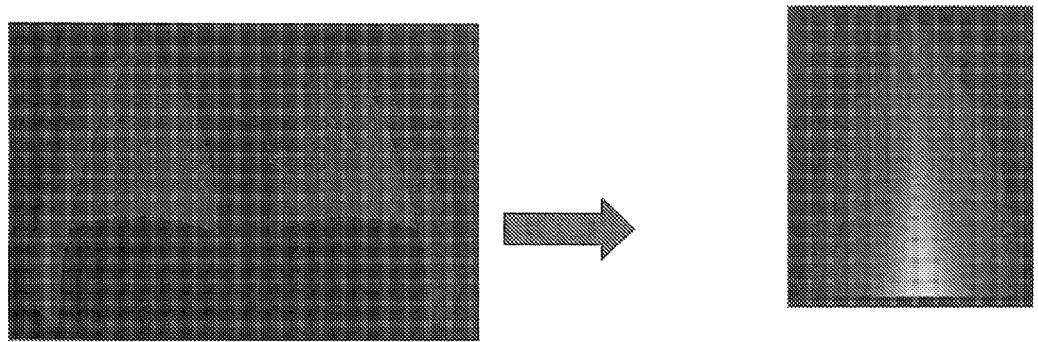
FIG. 4 illustrates two ogive dome halves and a fully bonded transparent ogive made from spinel ceramic.

A die was designed for the hot press to make half hemispherical domes from spinel ceramic. The two halves were given a high quality polish to provide a surface roughness of <1 nm and edge bonded similar to the process shown in Example 1. The final dome was surface polished and is shown in FIG. 3.

Example 3

This example demonstrates the fabrication of an ogive dome using two halves previously hot pressed in a custom die.

The edges are polished to <1 nm surface roughness and then edge bonded together, similar to process used in Example 1. The ogive dimensions will dictate the design of custom dies for use in the hot press to make the halve ogives.

This new edge bonding process has the capability to make complex shapes, such as domes, and especially ogive domes that cannot be made any other way with transparent spinel ceramic. It also enables scale up to larger samples, which could be complex shapes or just flat windows.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A method of making spinel ceramics comprising:
   polishing one edge of a first spinel part to a surface roughness of less than 1 nm;
   polishing one edge of a second spinel part to a surface roughness of less than 1 nm;
   joining the polished edge of the first spinel part to the polished edge of the second spinel part;
   heating the first and second spinel parts to about 1000-1200° C.; and
   maintaining said heating for about 3-6 hours resulting in bonded spinel parts.

2. The method of claim 1 further including the step of cooling to room temperature.

3. The method of claim 2 wherein said heating is at a rate of about 5° C./min and said cooling is at a rate of about 1° C./min.

4. The method of claim 3 further including the step of polishing the bonded spinel parts.

5. The method of claim 4 wherein said bonded spinel parts is a spinel ogive dome.

6. The method of claim 5 wherein said spinel ogive dome is a monolithic part with an invisible or almost invisible bondline.

7. A method of making a spinel ceramic comprising:
   polishing a first edge of a first spinel transparent tile, having dimensions of about 3"×3"×½" thick, wherein said polishing results in less than 1 nm surface roughness;
   polishing a first edge of a second spinel transparent tile, having dimensions of about 3"×3"×½41 thick, wherein said polishing results in less than 1 nm surface roughness;
   joining the polished edges;
   applying a load to the tiles;
   heating the tiles up to 1100° C. at 5° C./min and holding for 6 hours; and
   cooling slowly to room temperature at 1 ° C./min resulting in bonded spinel tiles.

8. The method of claim 7 further including polishing the bonded spinel tiles to remove surface debris and artifacts.

9. The method of claim 8 wherein the bonded spinel tiles exhibit optical transparency in a wavelength from the UV to about 5 μm, similar to the first spinel transparent tile and the second spinel transparent tile prior to bonding.

* * * * *